Sept. 18, 1928.
H. P. GROHN
1,684,864
CYLINDER AND TIRE GAUGE
Filed May 7, 1926
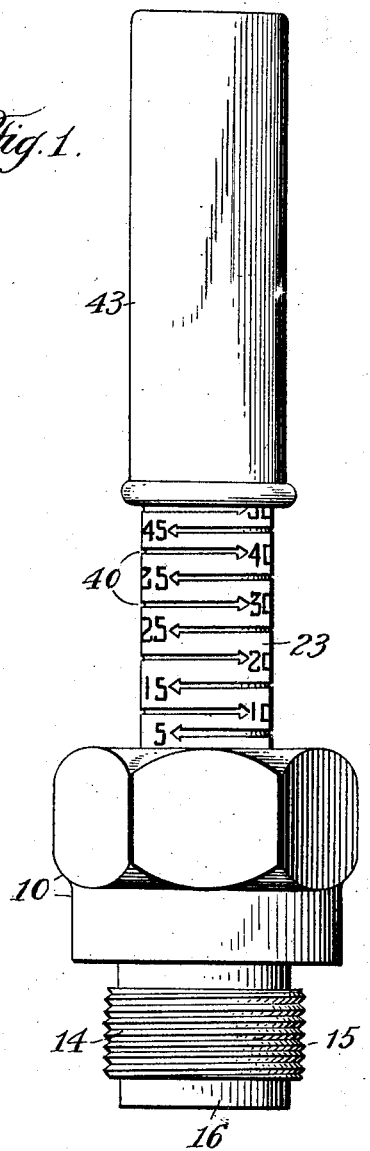
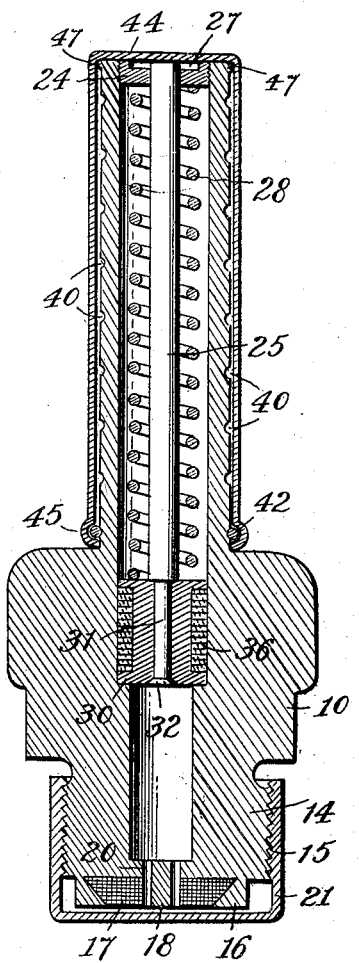
Inventor:
Henry P. Grohn,
By H. H. Snelling
Attorney
Witness:
Jas E. Hutchinson Patented Sept. 18, 1928.

1,684,864

UNITED STATES PATENT OFFICE.

HENRY P. GROHN, OF CHICAGO, ILLINOIS.

CYLINDER AND TIRE GAUGE.

Application filed May 7, 1926. Serial No. 107,451.

This invention relates to gauges and has for its principal object the provision of a simple and efficient gauge for testing tire pressure and also internal combustion engine compression, the parts being particularly made to withstand the gas in an engine cylinder.

A further object of the invention is the provision of a gauge of the type described in which a sleeve integral with the gauge body is telescoped into an indicator cap, means being provided, between the cap and sleeve, to hold the cap in position of maximum pressure after the piston has returned under urge of its spring.

A still further object of the present invention is the provision of specific means for rendering a cylinder gauge applicable for use with a tire by providing an integral deflector surrounded by a yielding packing held in place by an integral portion of the gauge body.

Other objects of the invention will be described in the following specification and particularly pointed out in the claims.

In the drawings:—

Figure 1 is an elevation of my device with the cap raised.

Figure 2 is a vertical section showing the cap entirely closed.

The main body portion 10 of the gauge is generally cylindrical, the upper portion however being faceted as usual to provide the usual wrench faces for convenient insertion of the device into place. At the lower half of the body is a gauge plug 14 threaded as at 15 to agree with standard spark plug construction. At the extreme bottom I groove out the lower face of the body leaving an annular flange 16 of such shape as to conveniently receive and hold a perforated flexible disk 17 of such resilience as to permit the deflator 18, integral with the body, to open the tire valve. The holes 20 may be of any desired number but I find that four holes are ample. A shield 21 is quite a convenience when the device is not in use but naturally must be slipped off before the gauge can be used for either tires or cylinders.

Just above the enlarged tool face portion of the body is an integral sleeve 23 threaded at its top free portion to receive a plug 24 in threaded engagement. This plug has a central cylindrical hole to receive a valve stem 25 and is preferably fitted with a shallow slot 27 to receive a tool by means of which the plug can be threaded into the sleeve against the force of the spring 28 which surrounds the stem 25 and is in engagement with the plug and with the piston 30 here shown as of spool shape, the central bore receiving a somewhat reduced end 31 of the stem which may be headed as at 32 so that the stem and piston form a unit conveniently denoted a plunger. Between the flanges of the spool shaped piston I wind a single strip of graphite packing 36, this packing being wound on end and being eminently suited to the purpose as it is not affected by the engine gases. The gasket 17 in the dove-tail groove may be of the same material except that it will be cut from a sheet.

The sleeve is graduated to show pounds of pressure and preferably each five pound graduation mark is a groove 40 sufficiently deep to afford an appreciable seat for a resilient ring 42 which grips the surface of the sleeve with just sufficient force to maintain the indicator cap 43 in position. This indicator cap preferably has a flat top 44 and a rim 45 outwardly bulged so as to form an annular spring receiving groove. While the spring 42 has sufficient strength to maintain the cap in position it should be as light as possible in order not to interfere with the accuracy of the device providing the spring 28 is a stock piece. The usual relative strength of the springs however, is such as to present no difficulty on this score. The annular flange 47 at the top of the sleeve 23 conveniently limits the upward travel of the indicator cap so as to prevent its loss. The length of the stem 25 is such that the ring 42 is just short of the flange 47 when the spring is entirely compressed.

There is no positive connection between the indicator cap of the piston stem but as the plunger rises from the position shown in Figure 2 to the position shown in Figure 1 the cap will rise with the plunger but when the spring 28 restores the plunger the cap will remain elevated so that the reading may conveniently be had after which the cap may be restored to lowest position by pressing down on the flat top 44. Altho I have described the device as having top and bottom its nature is such that it can be used in any position differing in this respect from some gauges which must be applied in a vertical position with the tire stem down.

What I claim is:—

1. A gauge consisting of a body having a two-diameter bore, an inwardly extending gasket receiving flange at one end of the body, a hollow cylindrical grooved sleeve extending from the body, a centrally perforated guide plug within said sleeve and closing the end thereof distant from the body, a piston in said body movable into said sleeve, a stem carried by said piston projecting thru said plug, a spring surrounding said stem and engaging the plug and piston, a cap surrounding said sleeve, and a ring held by said cap and engaging in order the grooves of the sleeve to prevent automatic return of the cap.

2. In a cylinder and tire gauge, a hollow body threaded to fit the spark plug opening of an engine cylinder, an integral sleeve extending from said body and having equispaced circumferential pressure indicating grooves in the outer surface of the sleeve, a tire nipple gasket secured to the threaded portion of the body, a guide plug at the end of said sleeve, a piston, a piston stem extending thru said plug, a spring surrounding said stem and engaging the piston and the plug, and an indicator cap frictionally engaging said sleeve and lying in the path of the stem so as to be moved in one direction by said stem, and spring means engaging the grooves of the cap in order so as to hold said cap in such moved position upon return of the piston by said stem surrounding spring.

In testimony whereof I affix my signature.

HENRY P. GROHN.